United States Patent [19]

Tamae et al.

[11] Patent Number: 4,970,423
[45] Date of Patent: Nov. 13, 1990

[54] STEPPER MOTOR WITH A ROTOR TEETH SENSOR

[75] Inventors: Hiroaki Tamae, Hirakata; Yoshihiro Ashizaki, Katano, both of Japan

[73] Assignee: Matsushita Electric Industrial Co., Ltd., Kadoma, Japan

[21] Appl. No.: 273,141

[22] Filed: Oct. 25, 1988

Related U.S. Application Data

[63] Continuation of Ser. No. 899,216, filed as PCT JP85/00680 on Dec. 10, 1985, published as WO86/03629 on Jun. 19, 1986, abandoned.

[30] Foreign Application Priority Data

Dec. 10, 1984 [JP] Japan ................................. 59-260248
Jan. 22, 1985 [JP] Japan ................................. 60-10558
Jul. 23, 1985 [JP] Japan ................................. 60-162413

[51] Int. Cl.⁵ ...................... H02K 29/12; H02K 37/04
[52] U.S. Cl. ................................ 310/162; 310/49 R; 310/68 B; 310/154; 318/602; 318/685
[58] Field of Search ............... 310/49 R, 68 B, 154, 310/77, 162, 254, 268; 318/254, 602, 685, 696

[56] References Cited

U.S. PATENT DOCUMENTS

| | | | |
|---|---|---|---|
| 3,293,459 | 12/1966 | Kreuter et al. | 310/49 R |
| 3,512,026 | 5/1970 | Tiltins | 310/165 |
| 3,958,139 | 5/1976 | Oudet | 310/49 R |
| 4,077,678 | 3/1978 | Studer et al. | 310/154 |
| 4,306,164 | 12/1981 | Itoh et al. | 310/49 R |
| 4,319,188 | 3/1982 | Ito et al. | 324/173 |
| 4,465,959 | 8/1984 | Yajima | 318/685 |
| 4,618,808 | 10/1986 | Ish-Shalom et al. | 318/685 |

FOREIGN PATENT DOCUMENTS

| | | |
|---|---|---|
| 2104370 | 1/1971 | Fed. Rep. of Germany . |
| 2209084 | 2/1972 | Fed. Rep. of Germany . |
| 2416266 | 4/1974 | Fed. Rep. of Germany . |
| 2620935 | 5/1976 | Fed. Rep. of Germany . |
| 2912232 | 3/1979 | Fed. Rep. of Germany . |
| 39-24414 | 8/1964 | Japan . |
| 44-4980 | 2/1969 | Japan . |
| 58-119760 | 7/1983 | Japan . |
| 58-157364 | 9/1983 | Japan . |

Primary Examiner—Steven L. Stephan
Assistant Examiner—D. L. Rebsch
Attorney, Agent, or Firm—Cushman, Darby & Cushman

[57] ABSTRACT

A stepping motor having a non-touch rotation sensor includes rotor core 5 having magnetic pole teeth of a uniform angular pitch, a stator core 1 having plural magnetic pole teeth groups having magnetic pole teeth of the same angular pitch as the rotor core magnetic pole teeth pitch, and a rotor teeth sensor mounted on the stator core for detecting the rotor magnetic pole teeth and issuing polyphase electric signals.

10 Claims, 13 Drawing Sheets

FIG. IIA
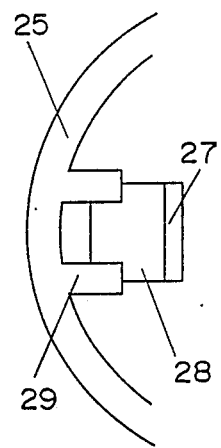
FIG. IIB
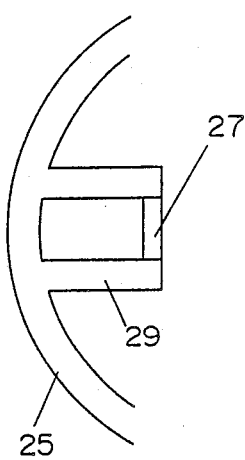
FIG. IIC
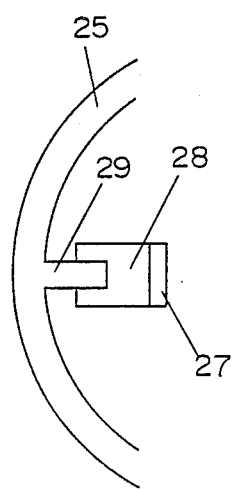
FIG. IID
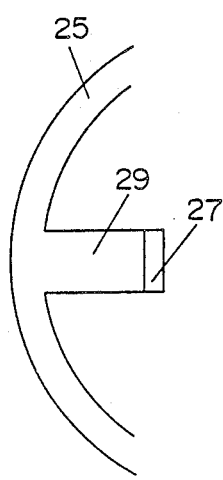

STEPPER MOTOR WITH A ROTOR TEETH SENSOR

This is a continuation of application Ser. No. 06/899,216, filed as PCT JP85/00680 on Dec. 10, 1985, published as WO86/03629 on Jun. 19, 1986, which was abandoned upon the filing hereof.

TECHNICAL FIELD

The present invention relates to a reluctance torque type brushless motor for office automation apparatus such as a head actuator of a hard disk apparatus.

BACKGROUND ART

With the spread of personal computers, the increased use of floppy disk apparatuses, hard disk apparatuses and optical disk apparatuses as external memories is remarkable. In particular, the demand for hard disk apparatus having short access time and large capacity increases.

The hard disk apparatus comprises a spindle motor, a disk, a head actuator, a magnetic head, a disk enclosure, a breathing filter, a position control circuit and a recording and reproducing circuit. The head actuator is an important device for positioning the magnetic head with good precision and high-speed.

Hitherto a voice coil motor and a step motor have been mainly used as the actuator for the hard disk.

The using of the voice coil motor has an advantage in that it can easily obtain a precise position control because it has no cogging, but it has a disadvantage in that the size and the power consumption necessary to obtain the desired driving force is large.

On the other hand, using the step motor has an advantage in that the driving circuit is simple, because it is usable with an open loop motor driving system and the size efficiency of the driving force is better than that of the voice coil motor. However, it has the disadvantage of being inadequate for precise position control. Further, the step motor can rotate a rotor in such a way as to correspond to a period of external pulses, sequentially changing a magnetic stable status by changing the conducting mode of the coils, by means of the external pulses. However, the step motor has the disadvantage of an asynchronous phenomenon.

The asynchronous phenomenon is that the rotor can not follow the speed of the external block because the conducting mode shifts to the next mode if the switching of the coil conducting mode is faster than a predetermined speed in case the rotor does not reach the magnetic stable point, or in case the rotor is in a transient state, to a vibrationally stable status.

In order to resolve the above-mentioned problem, closed loop driving of the step motor is being widely used. This is a method such that, by providing an optical or a magnetic position detector at the outside of the step motor, electrification of the coil is controlled by the output of the detector, thereby enabling rotation up to high speed without asynchronism.

However, in the above-mentioned method using the external position detector, the size of the actuator is large because the position detector is provided independently of the motor part, and the detected signals are liable to fluctuate on account of the irregularity of positions of magnetizations of the magnetic drum of the position detector. Further, the accurate positioning of the position detector on the rotor is difficult.

As mentioned above, the voice coil motor used in the office automation apparatus, particularly in the hard disk apparatus, has disadvantages such as large size and large power consumption. The step motor widely used in the office automation apparatus also has disadvantages, such as difficulty of obtaining fine positioning and inducing asynchronous phenomena. Further, when the position detector is attached to the step motor, the size is large and it is troublesome to attach the position detector.

SUMMARY OF THE INVENTION

In view of the above-mentioned problems, the present invention offers a brushless motor which is suitable for miniaturization and is easy to construct and further has fine positioning control characteristics and high torque characteristics.

In order to resolve the above-mentioned problems, the brushless motor of the present invention comprises:

(a) a rotor core of magnetic material comprising magnetic pole teeth of plural convexities and concavities with a uniform angular pitch, (b) a stator core of magnetic material having plural groups of magnetic pole teeth which face said rotor core through a minute air gap and have magnetic pole teeth with the same angular pitch as that of the rotor core magnetic pole teeth, (c) a permanent magnet mounted on the stator core or the rotor core, (d) a plural polyphase coil mounted on the stator core, (e) a bearing rotatably supporting the rotor with an air gap between the rotor core and the stator core, and (f) rotor teeth sensor disposed on the circumference of the stator or near the circumference of the stator, for detecting the rotor magnetic pole teeth, and for issuing polyphase electric signals having different phases from each other.

Under the above-mentioned constitution, the torque of the brushless motor of the present invention is generated by changes in reluctance like the step motor, and large torque is generated by relatively little power. Further, since the cogging is small, it is suitable for minute positioning, and smooth movement having no torque ripple is obtained by detecting the position of the magnetic pole teeth of the rotor and changing the current.

DETAILED DESCRIPTION OF THE PREFERRED EMBODIMENT

Figure 1:
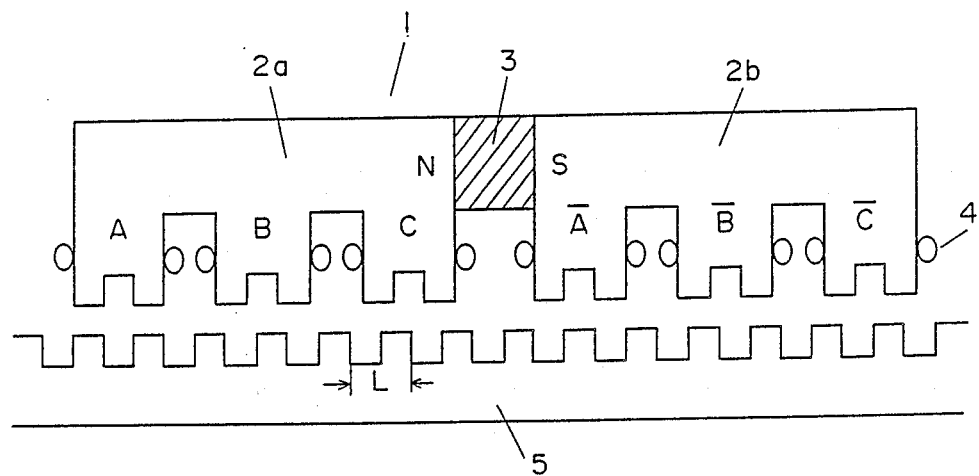
FIG. 1 is a diagram for describing a principle of the brushless motor of the present invention.

A brushless motor of a first embodiment of the present invention is described as follows referring to the drawings.

FIG. 1 is the principle explanatory diagram showing the motor laid out linearly. A stator core 1 comprises a core 2a having magnetic pole teeth groups A, B and C, and a core 2b having magnetic pole teeth groups $\overline{A}$, $\overline{B}$ and $\overline{C}$. Permanent magnet 3 is disposed between the stator core 2a and 2b; coil 4 is wound on the magnetic pole teeth group of the stator core 1; rotor core 5 has magnetic teeth of plural convexities and concavities of a constant angle pitch. The magnetic pole teeth groups A, B, C of the stator core 1 have the same pitch as that of the magnetic pole teeth (pitch L) of the rotor core 5, and have phase differences of 0 pitch, L/3 pitch, respectively and −L/3 pitch. The magnetic pole teeth groups $\overline{A}$, $\overline{B}$ and $\overline{C}$ also have phase differences of L/2 pitch, L/2+L/3 and L/2−L/3. Here, a permeance variation of each magnetic teeth group can be dealt with as a sine wave by devising the teeth shapes and is represented by the following formula.

$$PA = Po + P \cdot \cos O$$
$$\overline{PA} = Po - P \cdot \cos O$$
$$PB = Po + P \cdot \cos(O - 120°)$$
$$\overline{PB} = Po - P \cdot \cos(O - 120°)$$
$$PC = Po + P \cdot \cos(O - 240°)$$
$$\overline{PC} = Po - P \cdot \cos(O - 240°)$$

$$Po = \frac{P\text{Max} + P\text{min}}{2}$$

$$P = \frac{P\text{Max} - P\text{min}}{2}$$

wherein,
Pmax: permeance when the teeth face each other
Pmin: permeance when the teeth do not face each other $$O = 2\pi \cdot \frac{X}{L}$$

(and 120°=⅔π; 240°=4/3π)

The magnetic flux generated by the permanent magnet is shown as follows.

$$\Phi mA = \left(1 + \frac{P}{Po} \cos \right) Om\text{(sic)}$$

$$\Phi mB = \left(1 + \frac{P}{Po} \cos(O - 120°) \right)\Phi m$$

$$\Phi mC = \left(1 + \frac{P}{Po} \cos(O - 240°) \right)\Phi m$$

$$\Phi m\overline{A} = \left(1 - \frac{P}{Po} \cos O \right)\Phi m$$

$$\Phi m\overline{B} = \left(1 - \frac{P}{Po} \cos(O - 120°) \right)\Phi m$$

$$\Phi m\overline{C} = \left(1 - \frac{P}{Po} \cos(O - 240°) \right)\Phi m,$$

where
3Φm: average magnetic flux generated by the permanent magnet.

Next, coil current flows are mentioned below.

$$IA = Io \cdot \sin O$$
$$\overline{IA} = -Io \cdot \sin O$$
$$IB = Io \cdot \sin(O - 120°)$$
$$\overline{IB} = -Io \cdot \sin(O - 120°)$$
$$IC = Io \cdot \sin(O - 240°)$$
$$\overline{IC} = -Io \cdot \sin(O - 240°).$$

The magnetic fluxes generated by the coil are $$\Phi CA = -N \cdot PA \cdot IA$$
$$\Phi C\overline{A} = -N \cdot \overline{PA} \cdot \overline{IA}$$
$$\Phi CB = -N \cdot PB \cdot IB$$
$$\Phi C\overline{B} = -N \cdot \overline{PB} \cdot \overline{IB}$$
$$\Phi CC = -N \cdot PC \cdot IC$$
$$\Phi C\overline{C} = -N \cdot \overline{PC} \cdot \overline{IC},$$

where
N: coil winding number of one magnetic pole teeth group

Magnetic flux of each phase is sum of Φm and Φc as follows:

$$\Phi A = PA\left(\frac{\Phi m}{Po} - N \cdot IA\right)$$

$$\Phi \overline{A} = \overline{PA}\left(\frac{\Phi m}{Po} - N \cdot \overline{IA}\right)$$

$$\Phi B = PB\left(\frac{\Phi m}{Po} - N \cdot IB\right)$$

$$\Phi \overline{B} = \overline{PB}\left(\frac{\Phi m}{Po} - N \cdot \overline{IB}\right)$$

$$\Phi C = PC\left(\frac{\Phi m}{Po} - N \cdot IC\right)$$

$$\Phi \overline{C} = \overline{PC}\left(\frac{\Phi m}{Po} - N \cdot \overline{IC}\right).$$

On the other hand, the variation of the reluctance is described as follows.

$$PA = Ro - r\cos O$$
$$\overline{PA} = Ro + r\cos O$$

-continued $RB = Ro - r\cos(O - 120°)$
$RB = Ro - r\cos(O - 120°)$
$RC = Ro - r\cos(O - 240°)$
$RC = Ro + r\cos(O - 240°)$ $$Ro = \frac{Rmax + Rmin}{2}$$

$$R = \frac{Rmax - Rmin}{2}$$

where

Rmax: reluctance when the teeth do not face each other,

Rmin: reluctance when the teeth face each other. The generated force of each phase is represented by the following formula $$Fi = -\frac{1}{2} \Phi i^2 \frac{dRi}{dX}$$

$(i = A, B, C, \overline{A}, \overline{B}, \overline{C})$ where the total generated force is $F = \Sigma Fi = 1/L \cdot 2\pi \cdot N \cdot Io \cdot Bm \cdot Sm - m$ (where, m=(P/Po), Bm=magnetic flux density at the permanent magnet operation point, Sm=permanent magnet sectional area). A generated force having no cogging or ripple is obtained when the current of the sine wave flows and the variation of the permeance is of the sine wave type.

The cogging and torque ripple being small leads to a decrease of the disturbance harming positioning and to improvement of the accuracy of the positioning of the motor.

Figure 2:
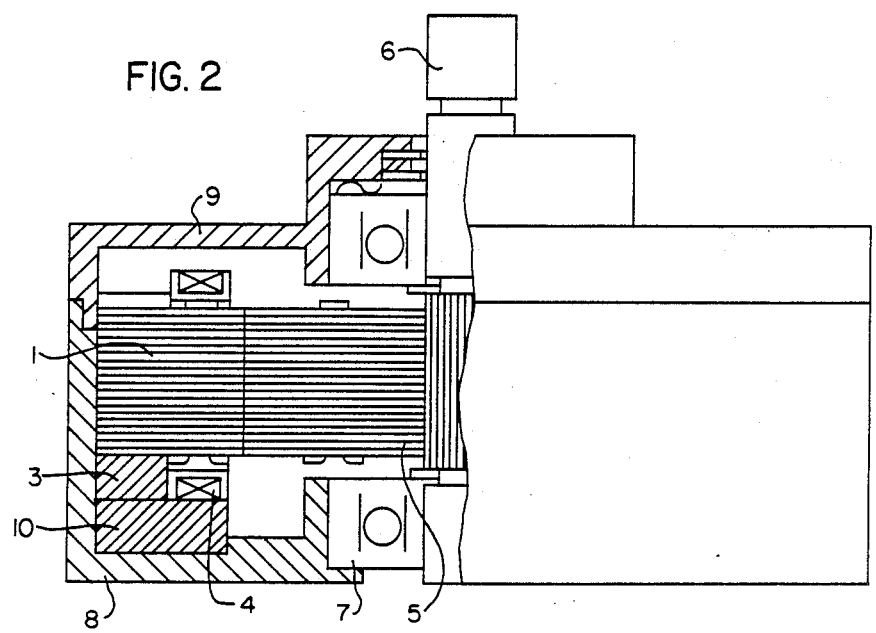
FIG. 2 and FIG. 3 are cross-sectional views of a first embodiment of the brushless motor.
Figure 3:
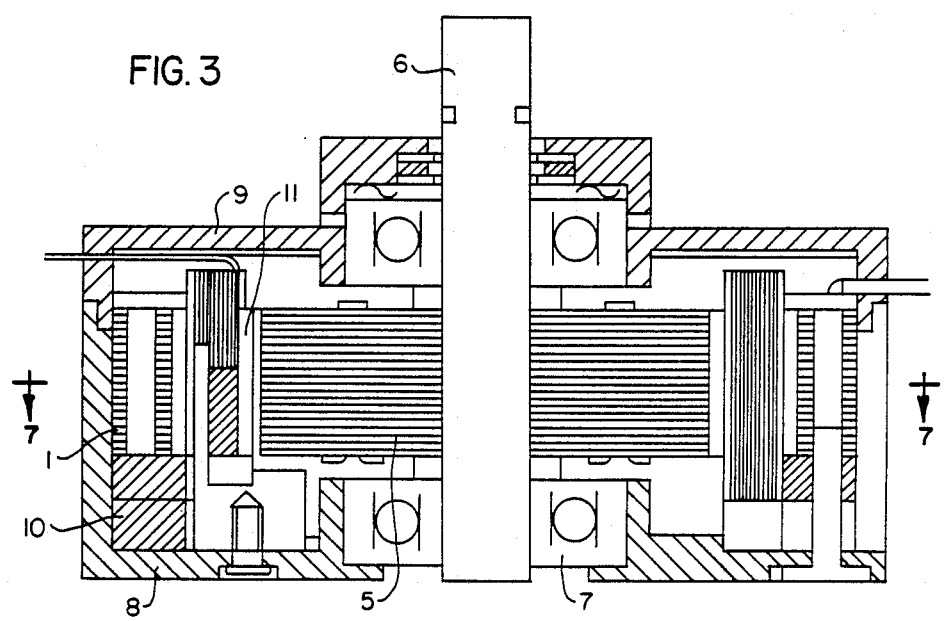
Figure 7:
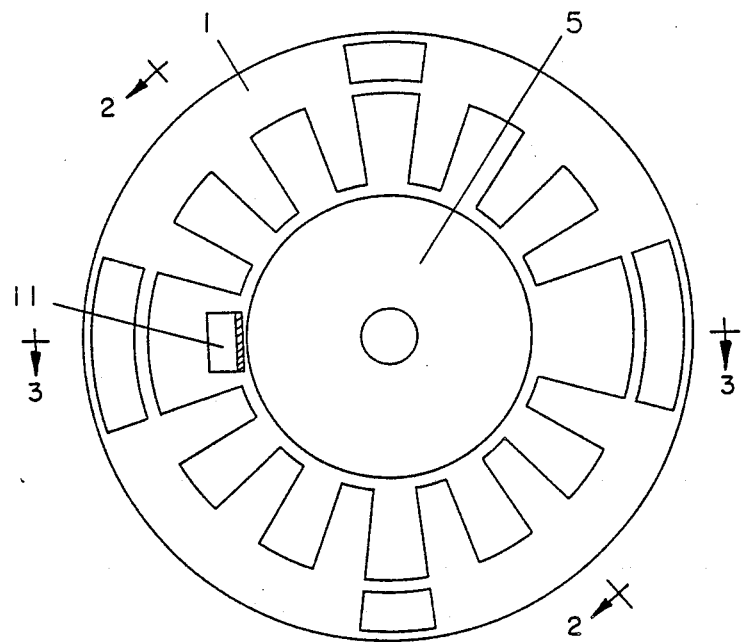
FIG. 7 is a view showing a disposition of a rotor teeth sensor of the first embodiment, along the line 7—7 in FIG. 3.

FIG. 2 is a partial cross-sectional view of the present embodiment, taken along the line 2—2 in FIG. 7 and FIG. 3 full is a cross-sectional view along the line 3—3 in FIG. 7 showing the mounting of the position detector. The rotor core 5 having teeth of the same angle pitch on the circumference is press-mounted on a shaft 6 and is mounted in a case 8, 9, by a bearing 7. The coil 4 is wound around the stator core 1, and the permanent magnet 3 is attached to it and fixed to the case 8 through a yoke 10. Further, a rotor teeth sensor 11 is fixed to the case 8 and disposed with a minute gap between it and the outer periphery of the rotor core 5. The non-contact sensor 11 detects the convexities and concavities of the teeth of the rotor core 5 by magnetic means or optical means and converts it to an electric signal, to provide electric signals for controlling electrifications for the respective coil.

Figure 4:
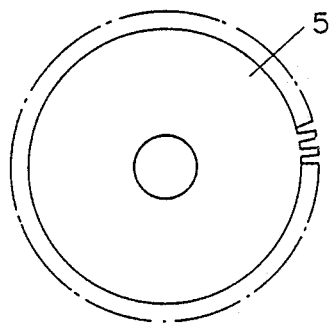
FIG. 4 is a view showing a constitution of a rotor core of the first embodiment.
Figure 5:
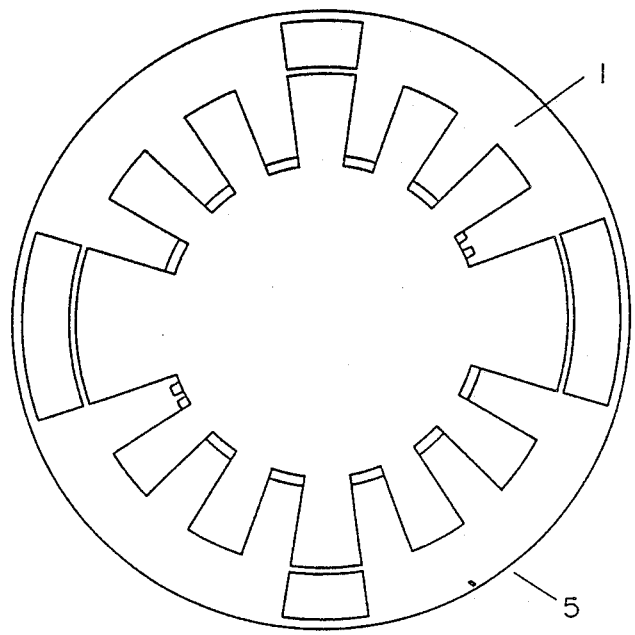
FIG. 5 is a plane view of the stator core of the first embodiment, FIGS. 6, (a) to (d) are views each showing a disposition of a permanent magnet in the first embodiment.
Figure 6A:
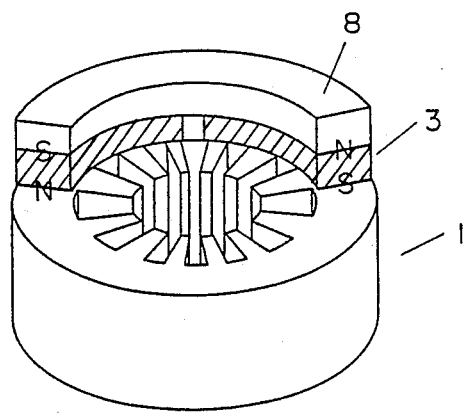
Figure 6B:
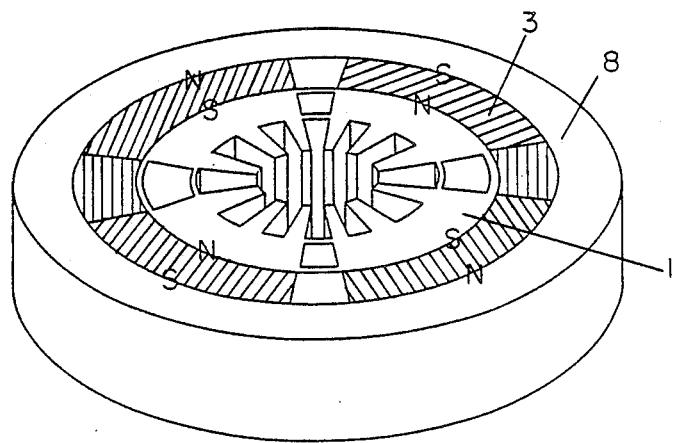
Figure 6C:
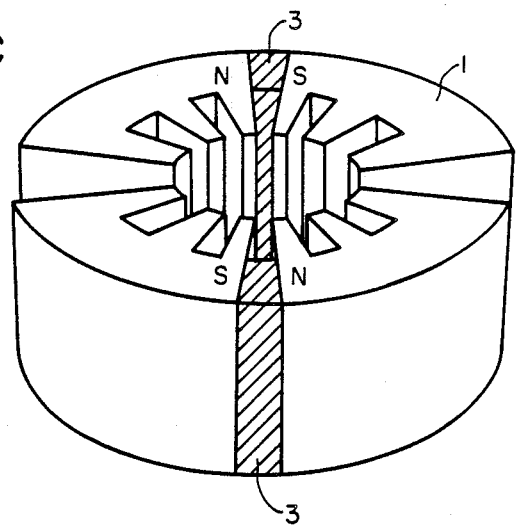
Figure 6D:
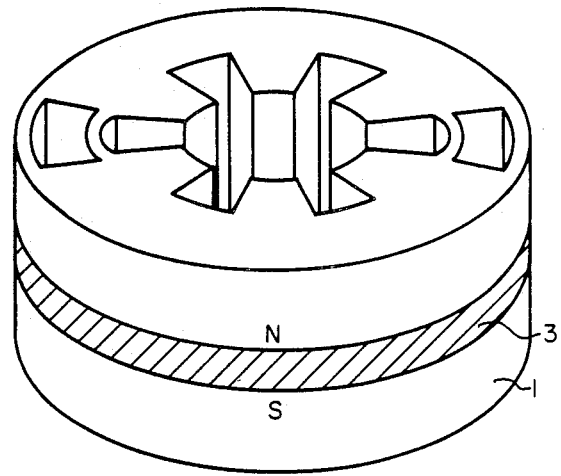

FIG. 4 shows configuration of the rotor core 5, and FIG. 5 shows a schematic configuration of the stator core 1. The rotor core 5 has magnetic pole teeth having uniform pitch on the whole circumference thereof; the stator core 1 has magnetic pole teeth which face to the magnetic pole teeth of the rotor core 5 and has a fundamental unit comprising six magnetic pole teeth groups which are different in phase from each other. Of course plural fundamental units of magnetic pole teeth groups may be disposed on the same stator.

FIG. 6 shows the mounting of the permanent magnet 3 in the stator core 1. Mounting methods may include (a) mounting the permanent magnet 3 between the stator core 1 and the yoke 8 which are disposed in an axial direction, (b) mounting the permanent magnet 3 between the stator core 1 and the yoke 8 which are disposed in a radial direction, (c) mounting the permanent magnet 3 in a stator core 1 which is divided in a diametrical direction, (d) mounting the permanent magnet 3 in the stator core 1 which is divided into two parts in an axial direction, and so on.

The rotor teeth sensor 11 is disposed between the magnetic pole teeth groups of the stator core 1 as shown in FIG. 7 which is a view of the embodiment along the line 7—7 in FIG. 3.

A second embodiment of the brushless motor of the present invention is described as follows.

Figure 8A:
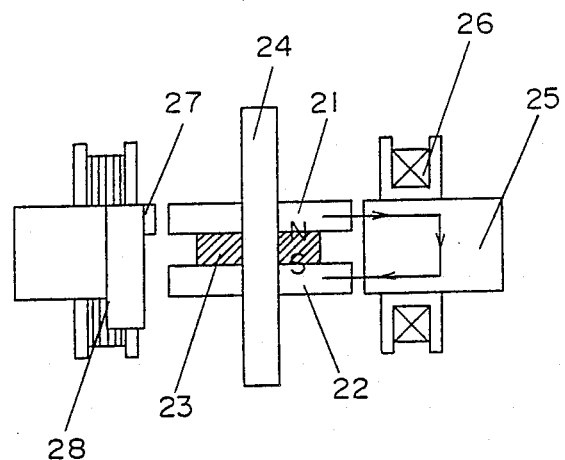
FIGS. 8, (a) and (b) are respectively a vertical cross-sectional view and a plane view showing a configuration of a main part of the brushless motor of a second embodiment of the present invention, FIGS. 9, (a) and (b) are respectively a view for explanation and an equivalent circuit diagram of the rotor teeth sensor used in the second embodiment, FIG. 10 (a) to (c) is a wave form chart of an output of the sensor, FIGS. 11, (a) to (d) and FIGS. 12, (a) and (b) are views each showing methods for mounting sensors of the second embodiment.
Figure 8B:
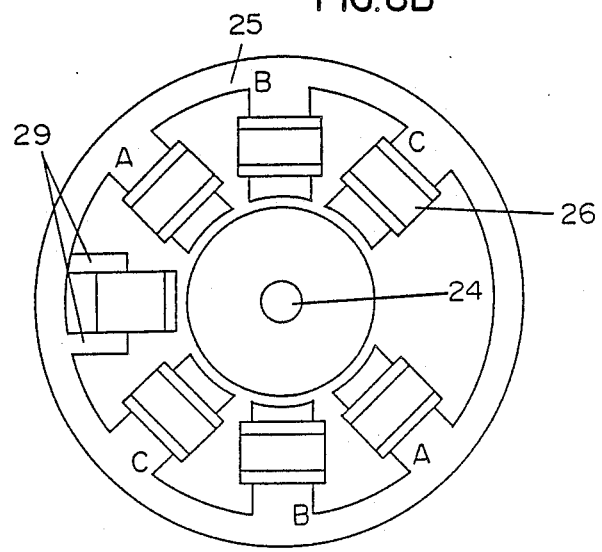

FIG. 8 is a view showing the main members of the second embodiment. In FIG. 8, numeral 21 is a first rotor core, with second rotor core 22 disposed at a distance from the first rotor core 21 in an axial direction, and permanent magnet 23 disposed between the first rotor core 21 and the second rotor core 22, these being fixed to a shaft 24. Numeral 25 is a stator core, numeral 26 is a coil wound around the stator 25, numeral 27 is a magnetic type rotor teeth sensor disposed facing the first rotor core 21 at some distance, numeral 28 is a base supporting the sensor, and numeral 29 is a protrusion provided on the stator core 25, which holds and positions the sensor supporting base 28.

The magnetic pole teeth facing the magnetic pole teeth groups A, B, C, $\overline{A}$, $\overline{B}$, $\overline{C}$ of the stator core 25 are formed on the circumference of the rotor cores 21, 22, though the magnetic teeth are not shown in FIG. 8.

The rotor core 21 and the rotor core 22 (with the permanent magnet 23 there between are disposed shifted by ½ of the magnetic pole teeth pitch to each other. The magnetic flux flow caused by the permanent magnet 23 is as indicated by a solid line arrow. Next the magnetic pole teeth groups A, B, C of the stator core 25 are shifted by ⅓ pitch to each other with respect to the rotor magnetic pole teeth and group B is shifted by ⅓ pitch with respect to group A, and group C is shifted by ⅓ pitch with respect to group B.

The coil 26 is wound around the stator 25 and a coil magnetic flux generated by a current flowing in the coil 26 offsets or strengthen the magnetic flux of the permanent magnet 23, thereby producing torque.

Figure 9A:
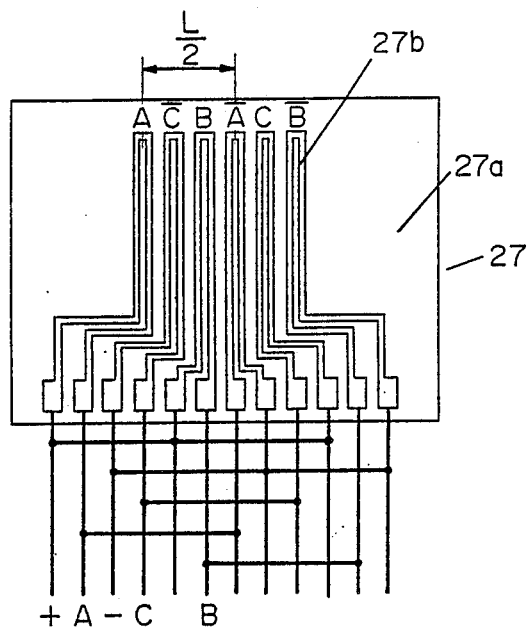
Figure 9B:
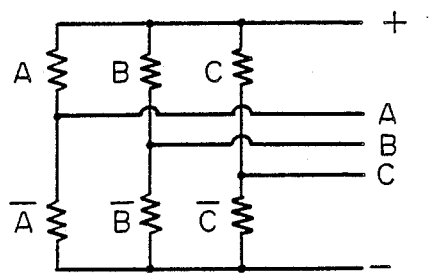
Figure 10A:
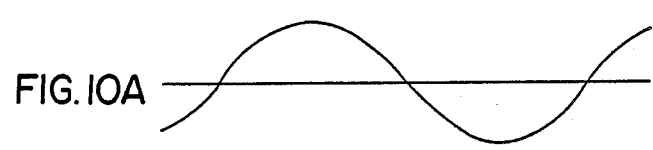
Figure 10B:
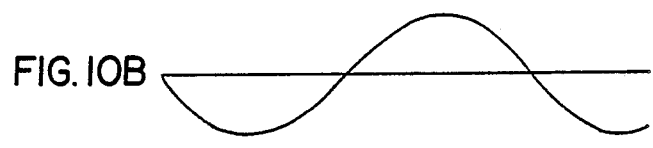
Figure 10C:
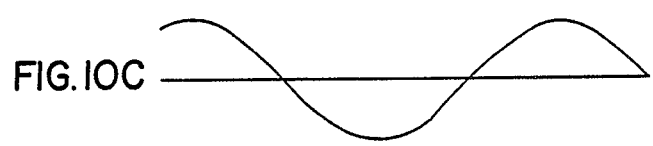

Since the motor of the present embodiment is a three-phase motor, the output of the rotor teeth sensor 27 is of the three-phase type. FIG. 9 shows the sensor constitution. A reluctance element 27b evaporated on a glass substrate 27a has characteristics such that the resistance value varies corresponding to the strength of the magnetic field applied thereto. Described with regard to one phase, two of the reluctance elements are disposed apart at a distance of ½ of the magnetic pole pitch. By connecting them as shown in FIG. 9 (a), an equivalent circuit as shown in FIG. 9 (b) is produced, and the output wave form becomes as shown in FIG. 10. The permanent magnet 23 is put between the rotor cores 21 and 22, and therefore it serves as a bias magnetic field for the sensor 27, and there are magnetic fields strengthened and weakened by the magnetic pole teeth of the rotor core in the peripheral part of the rotor core. The sensor 27 detects this and a nearly sine wave electric signal as the output signal is obtainable.

Figure 12A:
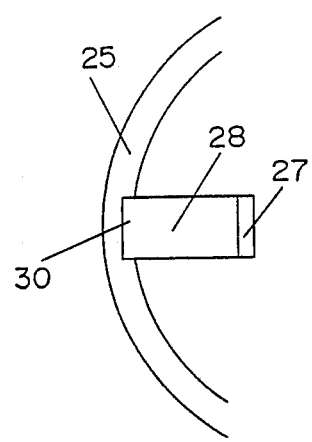
Figure 12B:
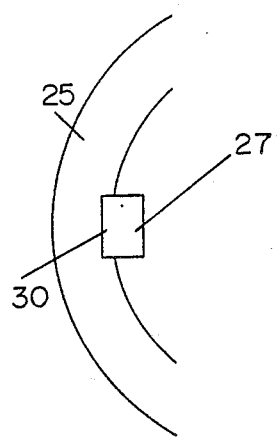

The attaching position of the sensor 27 has a certain positional relation with the stator magnetic teeth. Therefore, as shown in FIG. 11, for positioning the sensor 27 or the sensor supporting base 28, a protrusion 29 is formed on the stator core 25 or a cut part 30 is formed as shown in FIG. 12.

Next, a third embodiment of the present invention will be described.

Figure 13:
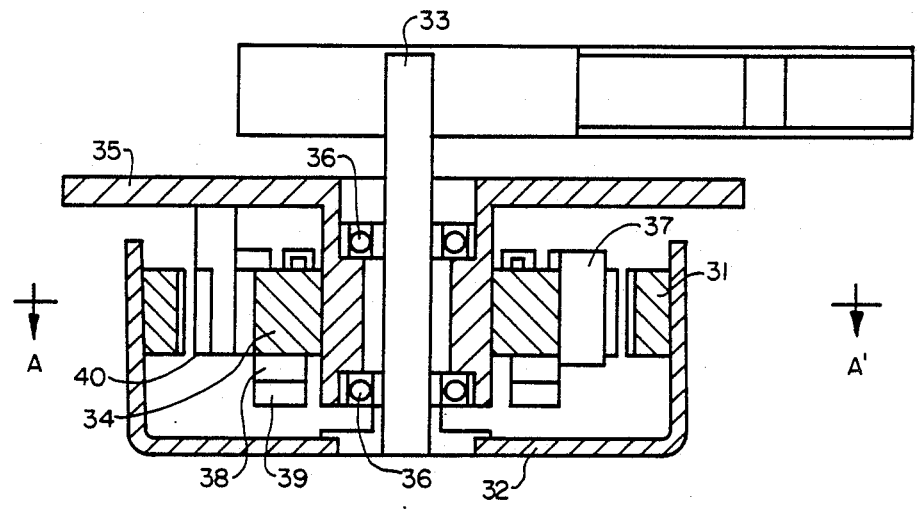
FIG. 13 is a cross-sectional view of a third embodiment of the brushless motor of the present invention.
Figure 14:
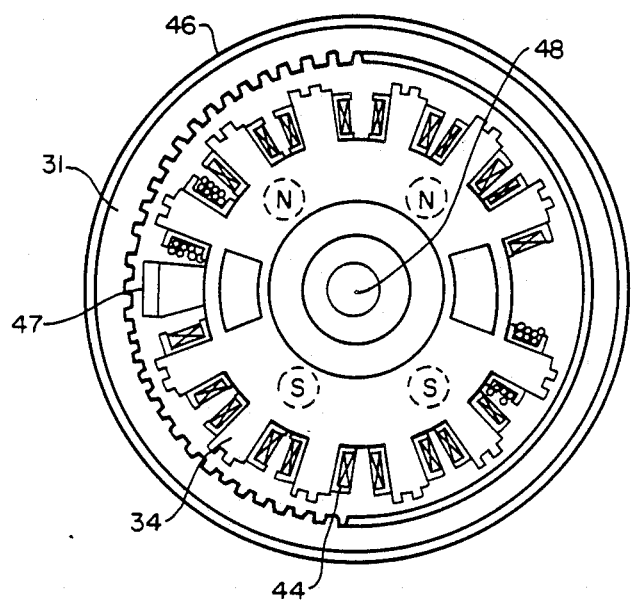
FIG. 14 is a lateral cross-sectional view thereof, and FIGS. 15, (a) to (c) are views showing dispositions of the magnets of the third embodiment.

FIG. 13 is a lateral cross-sectional view of the present invention and FIG. 14 is a cross-sectional view taken along A-A' of FIG. 13. A rotor core 31 having teeth of uniform angular pitch at the inner side thereof is fixed to a shaft 33 with an outer frame 32, and is supported rotatably by a bearing device 36 fixed to an inner frame 35 supporting the stator core 34. On the other hand the stator core 34 is wound around by a coil 37, and provided with a permanent magnet 38 and a yoke 39, and fixed to the inner frame 35 together with the bearing device 36. Further, a rotor teeth sensor 40 is disposed on the circumference of the stator core 34 and fixed to the inner frame 35. The rotor teeth sensor 40 is means for detecting the convexities and the concavities of the rotor magnetic pole teeth, like in the first and second embodiments.

Since each phase coil is provided with the conducting control instructions by the output signal of the sensor 40, the coil of optimum phase is always selected and electrified, and a motor of good efficiency is obtainable.

As shown in a cross-sectional view of FIG. 14, the stator core 34 has, as a fundamental unit, six magnetic pole teeth groups which are different in phase to each other with respect to the magnetic pole teeth of the rotor core 31. Of course, plural fundamental units of magnetic pole teeth groups can be disposed within the same stator core. The present embodiment is constituted with two fundamental units of magnetic pole teeth groups.

Figure 15A:
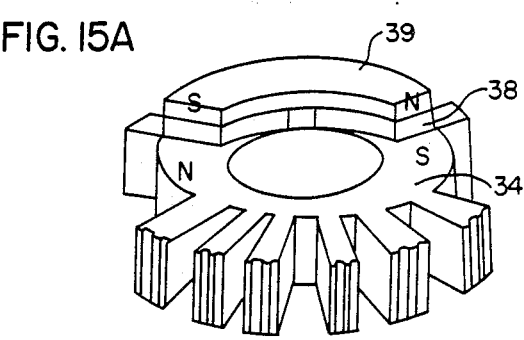
Figure 15B:
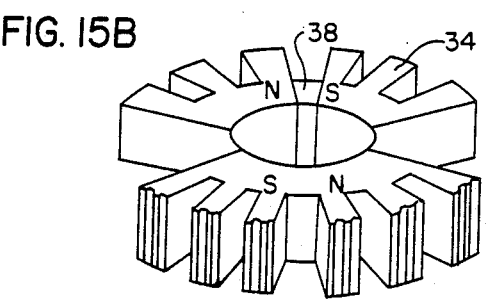
Figure 15C:
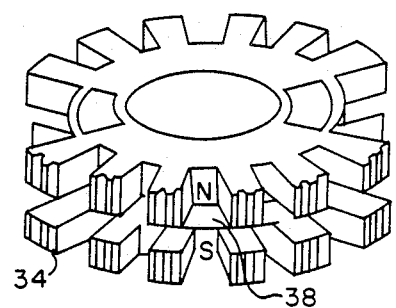

FIG. 15 shows the disposition of the permanent magnet 38. FIG. 15 (a) shows a method of disposition used in the present embodiment, and a magnetic circuit is constituted by connecting the two permanent magnets 38 with the yoke 39. Alternatively disposition methods are shown in: FIG. 15 (b) to dispose the permanent magnet 38 in a stator core 34 divided in a diametrical direction FIG. 15 (c) to dispose the permanent magnet 38 in a stator core 34 divided into two parts in an axial direction; and so on.

Incidentally, in the above-ellucidated first, second and third embodiments, embodiments using three-phase motors are shown, but two-phase motors or other polyphase motors may be used.

As mentioned-above, according to the present invention, brushless motors having large torque and small torque ripple and cogging are offered.

We claim:

1. A brushless motor comprising:
   a rotor core formed of a magnetic material having magnetic pole teeth at a uniform angular pitch,
   a stator core formed of a magnetic material, having a plural number n of magnetic pole teeth which face said rotor core across an air gap, said stator core magnetic pole teeth having a same angular pitch as the angular pitch of said rotor core magnetic pole teeth,
   a plurality of n phase coils provided on said stator core, energization of which causes magnetic attraction and repulsion between said rotor core and said stator core;
   bearing means for rotatably supporting said rotor core so that said air gap between said rotor core and said stator core remains substantially constant; and
   rotor teeth position sensor means located adjacent said rotor core for detecting a passage of said rotor magnetic pole teeth and issuing n phase electric conducting control signals to generate substantially sine-shaped output signals, each phase of said n phase signals being generated when said rotor teeth sensor means detects particular pole teeth and for supplying said n phase signals to said n phase coils to respectively energize each of said n phase coils at an appropriate time as indicated by said rotor position, detected by said rotor teeth position sensor means.

2. A brushless motor in accordance with claim 1, further comprising a permanent magnet on said stator core, and wherein:
   said magnetic pole teeth of said rotor core have a uniform angular pitch on a circumference of said rotor core,
   and
   said rotor teeth sensor means is mounted on said stator core between said magnetic pole teeth thereof.

3. A brushless motor in accordance with claim 1, wherein said rotor core comprises:
   a first rotor core of magnetic material having magnetic pole teeth with a uniform angular pitch on a circumference thereof,
   a second rotor core of magnetic material having magnetic pole teeth with a same pitch as said first rotor core, said magnetic pole teeth of said second rotor core being shifted by one-half a pitch of the magnetic pole teeth pitch with respect to the magnetic pole teeth pitch of said first rotor core,
   a permanent magnet disposed between said two rotor cores and magnetized in an axial direction, and
   wherein said rotor teeth position sensor means is disposed on or near an inner peripheral part of said stator core and disposed near a circumference of at least one of the said first and second rotor cores.

4. A brushless motor in accordance with claim 1, comprising a permanent magnet mounted on said stator core, and wherein
   said rotor teeth sensor means is mounted near the circumference of the stator core.

5. Apparatus according to claim 1 wherein said rotor teeth sensor means comprises:
   a substrate;
   a plurality of reluctance elements disposed on said substrate, each reluctance element having a resistance value which varies corresponding to a strength of an applied magnetic field; and
   wherein a distance between adjacent reluctance elements is substantially one-half of said pitch.

6. Apparatus according to claim 5 wherein said plurality of reluctance elements are coupled together to provide said polyphase electric signals.

7. Apparatus according to claim 1 wherein said rotor teeth position sensor means provides a three-phase electric signal.

8. A motor as in claim 1 wherein said rotor teeth position sensor means is mounted on an inner circumference of said stator core.

9. A motor as in claim 8, wherein said rotor teeth sensor means is located between adjacent ones of said magnetic pole teeth of said stator.

10. A motor comprising:
    a rotor core formed of a magnetic material having magnetic pole teeth at a uniform angular pitch;

a stator core formed of a magnetic material, having a plural number n of groups of magnetic pole teeth which face said rotor core;

a plurality of n phase coils provided on said stator core, energization of which causes magnetic attraction and repulsion between said rotor core and said stator core;

means for rotatably supporting said rotor core to form an air gap between said rotor core and said stator core which remains substantially constant; and rotor teeth position sensor means, located on an inner circumference of said stator core, for detecting a passage of said rotor magnetic pole teeth and issuing n phase electric conducting control signals as substantially sine-shaped output signals, each phase of said n phase signals being generated when said rotor teeth sensor means detects a particular group of pole teeth of said rotor and for supplying said n phase signals to said n phase coils to respectively energize each of said n phase coils at an appropriate time as indicated by said rotor position, detected by said rotor teeth position sensor means.

* * * * *